(12) United States Patent
Landis

(10) Patent No.: US 12,449,018 B2
(45) Date of Patent: Oct. 21, 2025

(54) CONNECTING STRAPS FOR SPORTS ACTIVITIES

(71) Applicant: Eric Michael Landis, Grand Junction, CO (US)

(72) Inventor: Eric Michael Landis, Grand Junction, CO (US)

( * ) Notice: Subject to any disclaimer, the term of this patent is extended or adjusted under 35 U.S.C. 154(b) by 537 days.

(21) Appl. No.: 17/938,576

(22) Filed: Oct. 6, 2022

(65) Prior Publication Data

US 2023/0243402 A1    Aug. 3, 2023

Related U.S. Application Data

(60) Provisional application No. 63/252,726, filed on Oct. 6, 2021.

(51) Int. Cl.
*F16G 11/00* (2006.01)
*B62J 50/00* (2020.01)

(52) U.S. Cl.
CPC ............. *F16G 11/00* (2013.01); *B62J 50/00* (2020.02)

(58) Field of Classification Search
CPC ...................................................... F16G 11/00
See application file for complete search history.

(56) References Cited

U.S. PATENT DOCUMENTS

| | | | | |
|---|---|---|---|---|
| 279,306 A * | 6/1883 | Name not available | | F16G 11/00 24/298 |
| 1,802,657 A * | 4/1931 | Kellems | | F16G 11/02 248/62 |
| 3,276,810 A * | 10/1966 | Antell | | B66C 1/18 87/6 |
| 5,205,803 A * | 4/1993 | Zemitis | | D07B 1/18 482/121 |
| 5,518,481 A | 5/1996 | Darkwah | | |
| 6,776,317 B1 * | 8/2004 | Parker | | B25H 3/00 224/904 |
| 7,032,529 B2 * | 4/2006 | Sanford | | F16F 7/006 482/121 |
| 7,458,135 B2 * | 12/2008 | Mikesell | | A45F 5/00 24/301 |
| 7,794,374 B1 * | 9/2010 | Park | | A63B 21/0552 482/122 |
| 7,798,712 B2 | 9/2010 | Russick | | |
| D741,419 S * | 10/2015 | Cohen | | D21/662 |
| 9,517,422 B2 * | 12/2016 | Resh | | A63H 33/006 |

(Continued)

FOREIGN PATENT DOCUMENTS

WO    2011/081534 A1    7/2011

OTHER PUBLICATIONS

"Overview of Materials for Nylon 6, Cast", MatWeb.com, [online], Year: 2017 [retrieved on Nov. 23, 2021]. Retrieved from <url: http://matweb.com/search/DataSheet.aspx?MatGUID= 8d78f3cfc6f49d595896ce6ce6a2ef1&ckck= 1 >, 3 pages.

(Continued)

*Primary Examiner* — Erez Gurari
(74) *Attorney, Agent, or Firm* — Heuton IP Law, LLC

(57) ABSTRACT

Connecting straps for use for example in sports activities and methods of attaching the connecting straps. Embodiments of the connecting straps include integral features for providing a variety of secure connections that are quick and easy to make and to disconnect, while also being lightweight and providing an elegant appearance.

20 Claims, 12 Drawing Sheets

(56) References Cited

U.S. PATENT DOCUMENTS

| | | | |
|---|---|---|---|
| 9,630,081 B2* | 4/2017 | Gillespie | A63B 71/0054 |
| 10,238,908 B2* | 3/2019 | Cummings | A63B 21/4021 |
| D850,546 S * | 6/2019 | Reese | D21/694 |
| 10,384,094 B1* | 8/2019 | Newman | A63B 21/0557 |
| 11,198,027 B2* | 12/2021 | Green Mullins | A62B 35/0075 |
| 11,478,372 B2* | 10/2022 | Sutti | A61H 1/0266 |
| 11,590,381 B2* | 2/2023 | Hollins | A63B 1/00 |
| 11,850,495 B2* | 12/2023 | Nock | A63B 71/0036 |
| 2007/0232468 A1 | 10/2007 | Levy | |
| 2009/0091100 A1 | 4/2009 | Barraza | |
| 2012/0202659 A1* | 8/2012 | Wroclawsky | A63B 21/0557 482/125 |
| 2012/0267403 A1* | 10/2012 | Ward, Jr. | A45F 5/00 224/219 |
| 2013/0067697 A1* | 3/2013 | Huang | A63B 21/0555 24/301 |
| 2013/0068697 A1 | 3/2013 | Featherstone | |
| 2013/0134689 A1* | 5/2013 | Barajas | B60D 1/18 280/480 |
| 2019/0351968 A1* | 11/2019 | Olszewski | B62K 13/025 |
| 2020/0398099 A1* | 12/2020 | Landis | A63B 21/0557 |
| 2023/0106104 A1* | 4/2023 | Landis | B60D 1/187 280/480 |

OTHER PUBLICATIONS

Notice of Allowance for U.S. Appl. No. 17/318,548, dated Sep. 30, 2021 ) 5 pages.
Nylon Material: Website: http://matweb.com/search/DataSheet.aspx?MatGUID=8d78f3cfcb6f49d595896ce6ce6a2ef1&ckck=1 (Year: 2017).
Official Action for U.S. Appl. No. 16/946,058, dated Jul. 19, 2022 16 pages.
Official Action for U.S. Appl. No. 16/987,523, dated Jul. 6, 2022 7 pages.
Official Action for U.S. Appl. No. 17/318,548, dated Jul. 22, 2021 16 pages.
Notice of Allowance for U.S. Appl. No. 16/946,058, dated Feb. 23, 2023 7 pages.
International Search Report and Written Opinion prepared by the United States Patent and Trademark Office dated Jan. 20, 2023, for International Application No. PCT/US2021/041092.

* cited by examiner

CONNECTING STRAPS FOR SPORTS ACTIVITIES

CROSS-REFERENCE TO RELATED APPLICATIONS

This application claims priority to U.S. Provisional Application Ser. No. 63/252,726 filed on Oct. 6, 2021, the entire disclosure of which is incorporated herein by reference.

BACKGROUND

When two participants of unequal strength or ability, for example an adult and child, participate in certain sporting or leisure activities together, such as riding bicycles or motorbikes or skiing together, it can be difficult or even impossible for them to both maintain the same speed. In some cases, such as bicycling uphill, the less proficient participant will fall behind, while in other cases, such as downhill skiing, the less proficient participant may end up unintentionally going too fast and potentially losing control. Thus, for safety and enjoyability of the activity it can be desirable to provide a way to join the two participants together.

However, it is important from a safety standpoint that any type of connecting strap be strong enough to avoid failure due to the forces that will be encountered, not dangle onto the ground or into a rider's wheel, and not jerk either user during use. It is also beneficial if the connection strap is easy to connect and can be quickly and easily disconnected when necessary.

SUMMARY

Aspects and embodiments are directed to connecting straps, and in particular to straps for connecting the equipment of two persons taking part in a sports activity, or in some cases a person or person-operated vehicle (such as a bicycle) and an object to be towed.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to connection systems including one or more connecting straps and methods of attaching the connecting strap(s) that allow two persons to engage in a joint sporting activity or allow a person to tow an object. In particular, as discussed in more detail below, aspects and embodiments are directed to specific, unique constructions of such connecting straps that offer significant benefits over existing strap configurations and connection systems.

Figure 1:
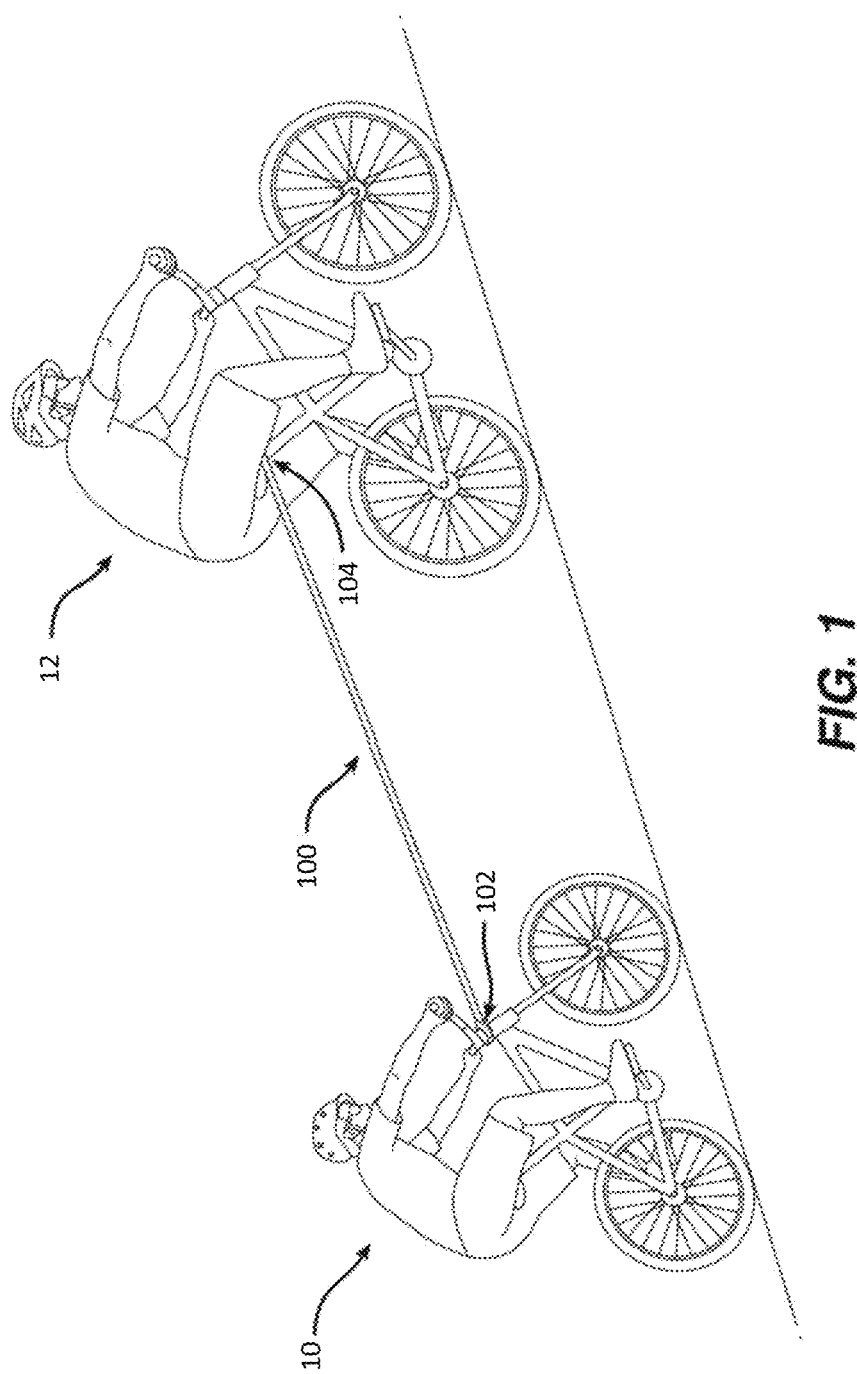
FIG. 1 is a perspective view of a pair of users using a connecting strap according to one implementation while bicycling.

Referring to FIG. 1, a connecting strap 100 is used to allow a pair of users of different abilities to bicycle together. This is but one example of a possible use of the connecting strap 100; many other uses are envisioned, as will be appreciated by those skilled in the art, given the benefit of this disclosure. In this example, a first loop 102 at a first end of the connecting strap 100 is attached to the bicycle of the trailing user 10, while a second loop 104 at the opposite end of the connecting strap 100 is slipped over the saddle of the bicycle of the leading user 12 such that it is looped around the seat post of user 12. In certain examples, the first loop 102 is girth hitched around the stem of the bicycle of user 10; however, a variety of other connection methods may be implemented, as discussed further below. These arrangements securely attach the connecting strap 100 at both ends and allow quick and easy attachment and removal.

Figure 2A:
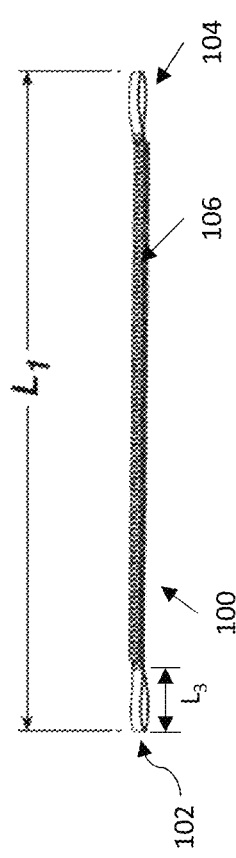
FIG. 2A is a side view of one example of the connecting strap in a fully relaxed (unstretched) condition.
Figure 2B:
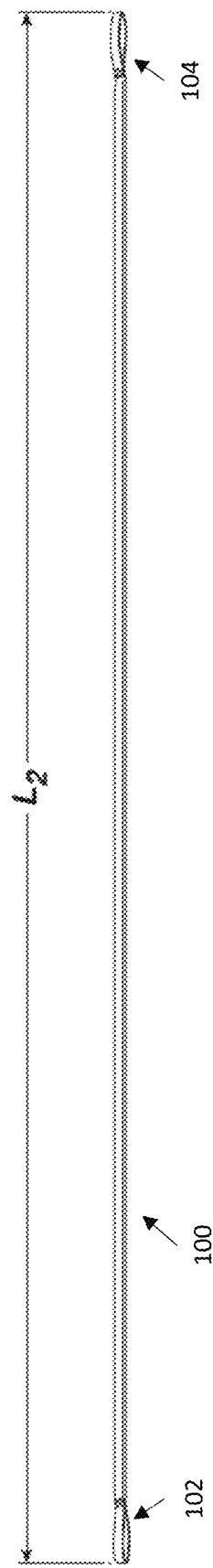
FIG. 2B is a side view of the connecting strap of FIG. 2A in a fully extended (stretched) condition, in which the webbing prevents over-stretching of the elastic band.
Figure 3:
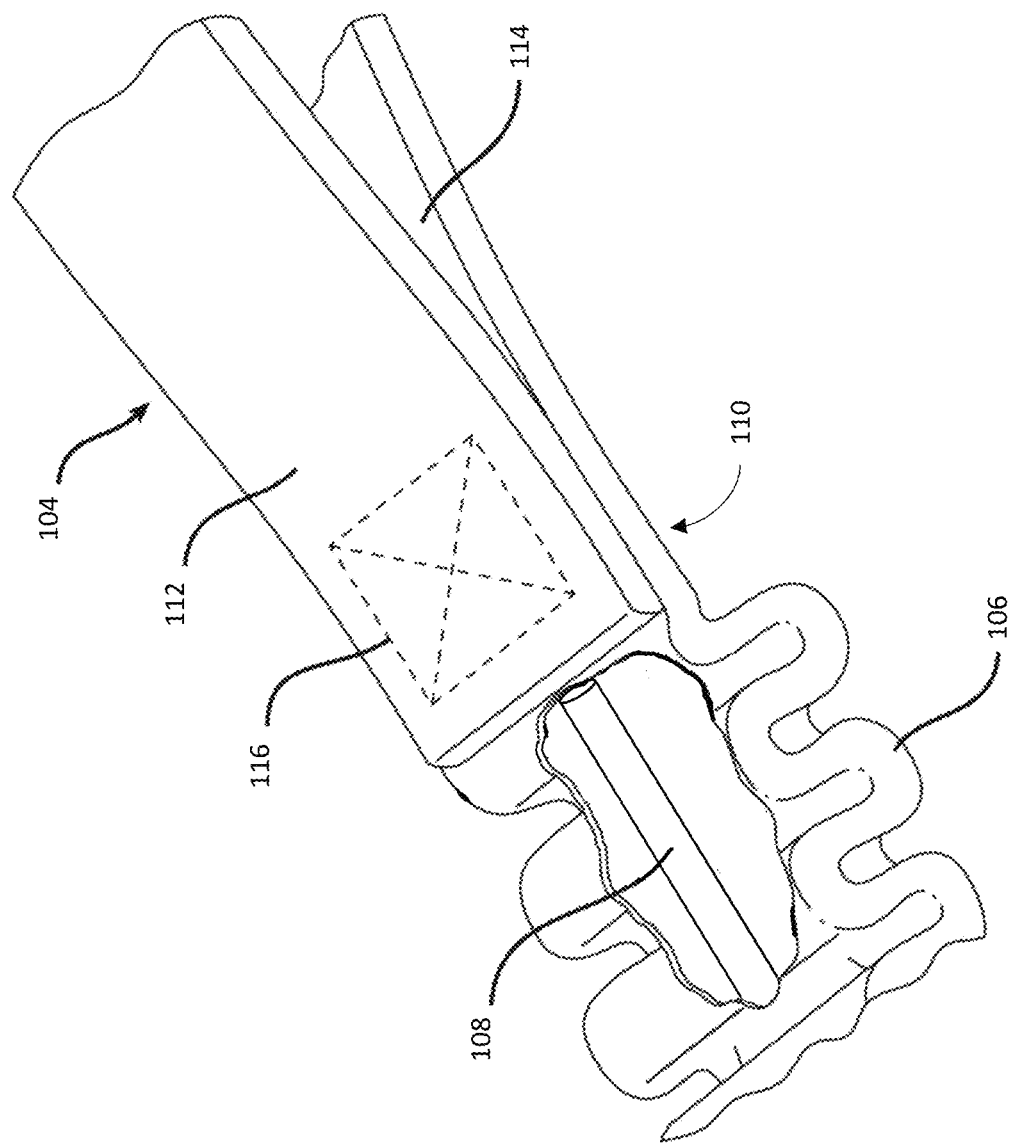
FIG. 3 is an enlarged, partially cut-away perspective view of a portion of the connecting strap, showing the elastic band and the base of a loop according to certain embodiments.

Referring now to FIGS. 2A, 2B and FIG. 3, the connecting strap 100 includes an outer sleeve 106 of webbing material which may be formed, for example, of a substantially inelastic (inextensible) material, such as woven polypropylene or Nylon. As shown in FIG. 3, a band of elastic material 108 is disposed within the sleeve 106.

The webbing material itself is substantially inextensible, but the sleeve is bunched up relative to the inner elastic band 20 during manufacture so that the sleeve can be extended to a much greater length by pulling on the opposite loops 102, 104. For example, the ratio between the length $L_1$ of the sleeve 106 in the fully relaxed (bunched up) state (FIG. 2A) and the length $L_2$ in the fully extended state (FIG. 2B) may be from about 1:3 to 1:4 (a stretch ratio of 3:1 to 4:1). The use of webbing in this bunched up arrangement around an elastic core is well known in the dog leash art. $L_1$ may be, for example, about 45 to 65 inches, and $L_2$ may be from about 160 to 200 inches. It is generally preferred that loops 102 and 104 be large enough to allow easy attachment, such as, for example, by slipping the loop over a bicycle saddle or girth hitching, as discussed above; however, if smaller loops are provided attachment can be by other means, e.g., a locking carabiner threaded through the loop. In some implementations, each loop 102, 104 has a length, $L_3$, when flattened against a surface, in a range of about 3 to 6 inches. In some cases, one or both of the loops 102, 104 may be longer, or of adjustable length, or have other features, as discussed further below.

The inner elastic band 108 is formed of a natural or synthetic rubber material that has greater extensibility than the sleeve 106. The band may have a length $L_1$ in its unstretched condition of from about (±1 inch) 40 to 50 inches. At full extension the band 108 may have a length $L_2$ of about 160 to 200 inches. Thus, for example, the elasticity of the band 108 may be such that the band could, if not inhibited by the sleeve 106, stretch to at least 4 times its relaxed length, i.e., have a stretch ratio of at least 4:1. In some implementations, the band 108 can stretch to 6 or more times its relaxed length, e.g., the band may have a stretch ratio of greater than 6:1 or even 7:1 or more. Because the band 108 is not fully stretched when further stretching is stopped by full extension of the sleeve 106 there is a safety factor to prevent inadvertent breaking of the band during use. It is preferred for many applications that the webbing forming the sleeve 106 have a tensile strength of at least 1000 lbs., preferably at least 1500 lbs.

In some embodiments, the elastic band 108 is preferably configured such that it pulls no more than 18 pounds, and in some implementations, no more than 15 pounds (for example, between 13 and 18 pounds) at the point at which it is fully extended to length $L_2$ (at which point the webbing sleeve 106 takes any additional load).

The elastic band 108 is secured within the sleeve 106 at two attachment points, corresponding to the locations of the bases of the two loops 102, 104. Referring to FIG. 3, there is illustrated a portion of an example of the connecting strap 100 showing the base 110 of the second loop 104. In certain examples, the elastic band 108 includes a single length of elastic, as shown in FIG. 3. In other examples, the elastic band 108 includes a continuous loop of elastic, as described in commonly-owned U.S. Patent Publication No. 2020/0398099, for example.

According to certain embodiments, the loops 102, 104 are integrally formed with the webbing sleeve 106. For example, the loops 102, 104 may be formed by doubling a free end 112 of the sleeve 106 back and securing the free end 112 to the standing end 114 with stitching 116, thereby forming the base of the loop with one continuous piece of webbing. The stitching 116 may be include bar tack stitching, for example. In certain examples, the elastic band 108 may be secured to the webbing sleeve 106 at the base 110 of the second loop 104 (and similarly at the base of the first loop 102) using the same stitching 116 that extends through the free end 112 and standing end 114 of the webbing 106 at the base 110 of the loop 104.

In certain examples, the elastic band 108 has a circular cross-section, as shown in FIG. 3; however, in other examples, the elastic band 108 may have a square cross-section, or a cross-section of another shape (e.g., rectangular or oval). In some examples, the elastic band 108 is formed of hollow tubing. In other examples, the elastic band 108 is solid rather than hollow.

Advantageously, the connecting straps 100 described herein have features that provide enhanced safety. For example, the connecting straps 100 tend to smoothly elongate under tension, rather than jerking the user who is being towed. In this regard, it is generally preferred that the webbing sleeve 106 have a small amount of elasticity in order to smooth the transition when the webbing sleeve takes the load at full elongation of the elastic band 108. Moreover, due to the protection provided by the sleeve 106 and the robust nature of the band 108, the connecting strap 100 can be subjected to relatively high forces, and suddenly applied forces, without danger of the inner band failing.

Figure 4:
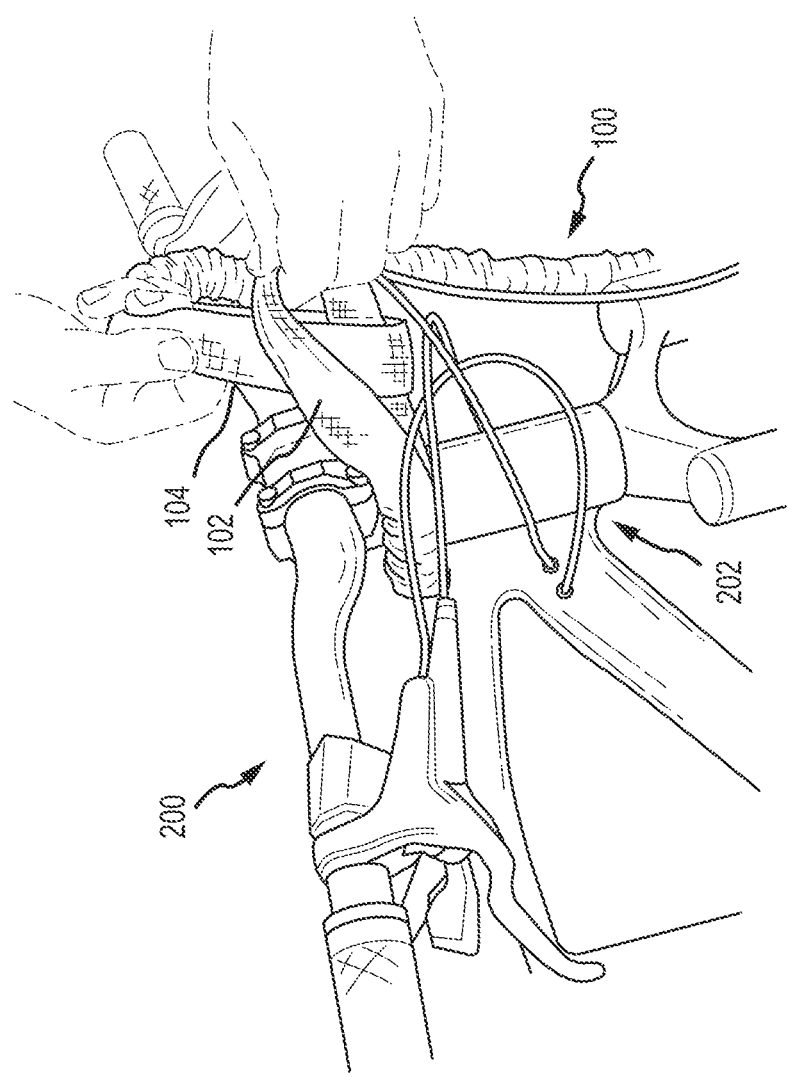
FIG. 4 is a perspective view showing the connecting strap being girth hitched to a bicycle, according to certain embodiments.

As discussed above, in certain applications, the connecting strap 100 may be girth hitched at one end to a bicycle or other object. FIG. 4 shows an example of an embodiment of the connecting strap 100 being girth hitched around the stem 202 of a bicycle 200. To make this connection, one end of the connecting strap 100 is wrapped around the stem 202 of the bicycle 200, and the other end, including the loop 104, is passed through the loop 102, as shown in FIG. 4, and the strap is pulled tight to make a secure connection around the stem 202. In some instances, when the girth hitch know is pulled tight, it can be difficult to loosen the knot to disconnect the connecting strap 100. Accordingly, to address this problem, embodiments of the connecting strap 100 include a feature that makes it easier to disconnect the connecting strap when it is girth hitched through its own loop.

Figure 5:
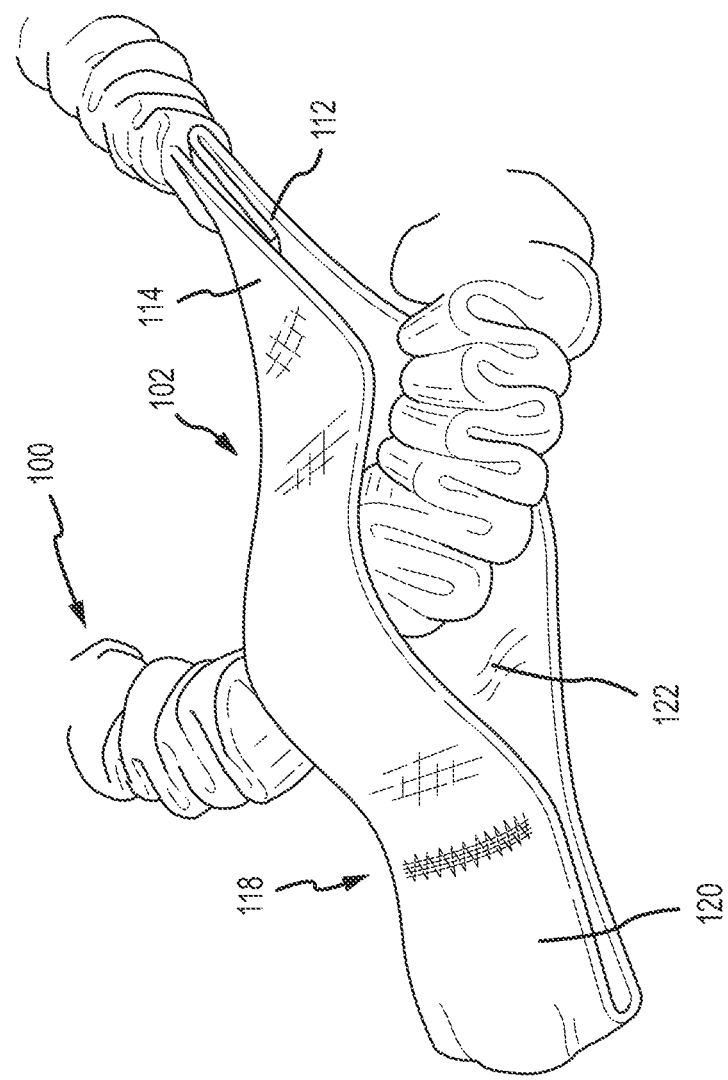
FIG. 5 is a perspective view showing a portion of the connecting strap in a girth hitch configuration and having a pull tab at the end of a loop, according to certain embodiments.
Figure 6:
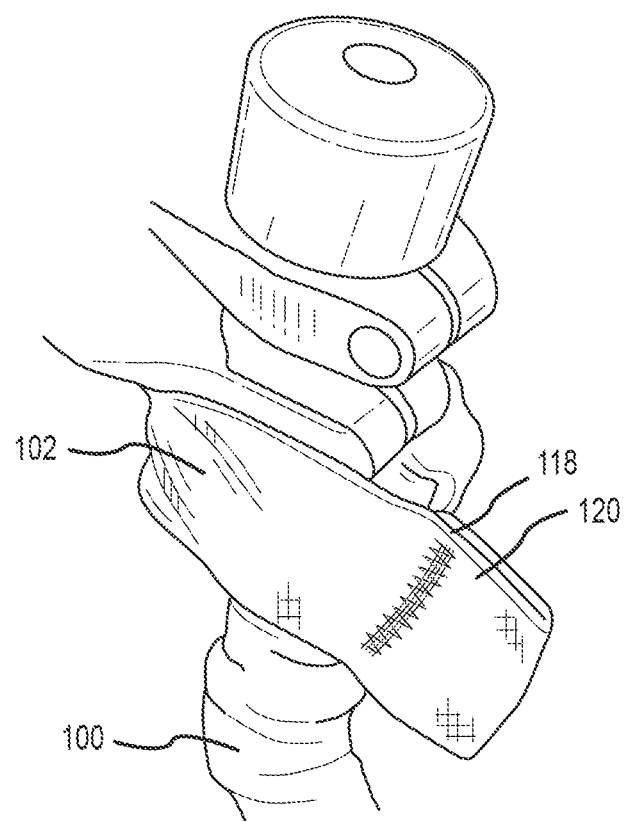
FIG. 6 is a perspective view showing an embodiment of the connecting strap, with the pull tab of FIG. 5, girth hitched around a bicycle.
Figure 7A:
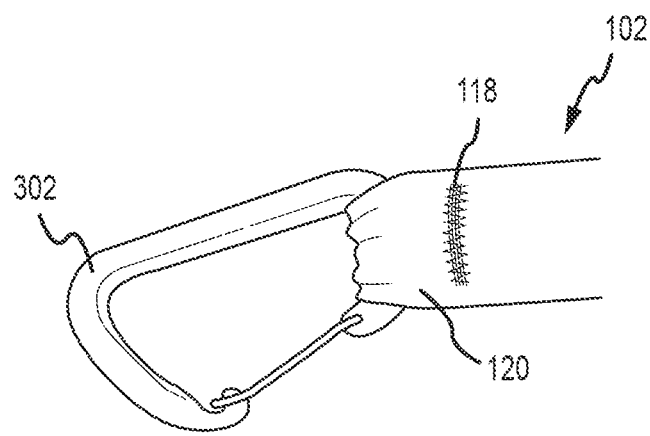
FIG. 7A is a top view of one example of a portion of an end loop of the connecting strap having a carabiner clipped through the pull tab, according to certain embodiments.

Referring to FIG. 5, there is illustrated a portion of one embodiment of the connecting strap 100. In this example, the loop 102 includes additional stitching 118 that forms a pull tab 120 at the end of the loop 102. The stitching 118, referred to herein as "tab stitching," extends through both the free end 112 and the standing end 114 of the loop 102 to "seal off" the pull tab 120 at the end of the loop 102 and separate it from the main opening 122 of the loop. Thus, the loop 102 has a main opening 122 through which the connecting strap 100 is passed in the girth hitch configuration, with the pull tab 120 separated from the main opening 122 by the tab stitching 118. The pull tab 120 provides a convenient grip location for a user to hold onto when loosening and removing the knot of the girth hitch to disconnect the connecting strap 100, as shown in FIG. 6. In one example, the pull tab 120 may have a length of approximately one (1) inch and the remaining portion of the loop 102 may have a length of approximately five (5) inches. In some examples, as shown in FIG. 5, the pull tab 120 may form a small secondary loop at the end of the main opening 122 of the loop 102. This may allow an object to be clipped to the pull tab 120 without interfering with the use of the loop 102. For example, a carabiner 302 (FIG. 7A), cord 304 (FIG. 7B), or other object (not shown) may be attached through the small secondary loop of the pull tab 120 while the main opening 122 of the loop 102 is used for girth hitching or another style of connection.

As discussed above, in certain embodiments, the loops 102, 104 are integral with the webbing sleeve 106 and are formed by doubling back the free end 112 of the webbing sleeve 106 and stitching it to the standing end 114 using the bar tack 116. In certain examples, a cleaner edge that is less subject to fraying and which may have a neater, more pleasing and more finished appearance, may be achieved by tucking the free end 112 under itself and between itself and the standing end 114, as shown in FIG. 5. Thus, a "three-layer" thickness of the webbing sleeve 106 is formed at the base 110 of the loop 102 (and similarly at the base of the loop 104), as shown in FIG. 5. The bar tack stitching 116 extends through both thicknesses of the free end 112 and the standing end 114, as well as through the elastic band 108 (not shown in FIG. 5) in certain examples (or through an attachment strap or other attaching mechanism that is connected to the elastic band, if not through the elastic band itself) to secure the elastic band 108 to the webbing sleeve 106 and to form the loops 102, 104.

As discussed above, in certain applications, including where two bicycles are to be connected together as in the example of FIG. 1, the connecting strap 100 can be girth hitched around the trailing bicycle/user. However, in some circumstances, it may be preferable to use a connection mechanism that can be disconnected more quickly and easily than a girth hitch. Accordingly, in certain embodiments, the connecting strap 100 is configured with preferably one (although optionally both) of the loops 102, 104 being replaced with an integral combination connection mechanism.

Figure 8A:
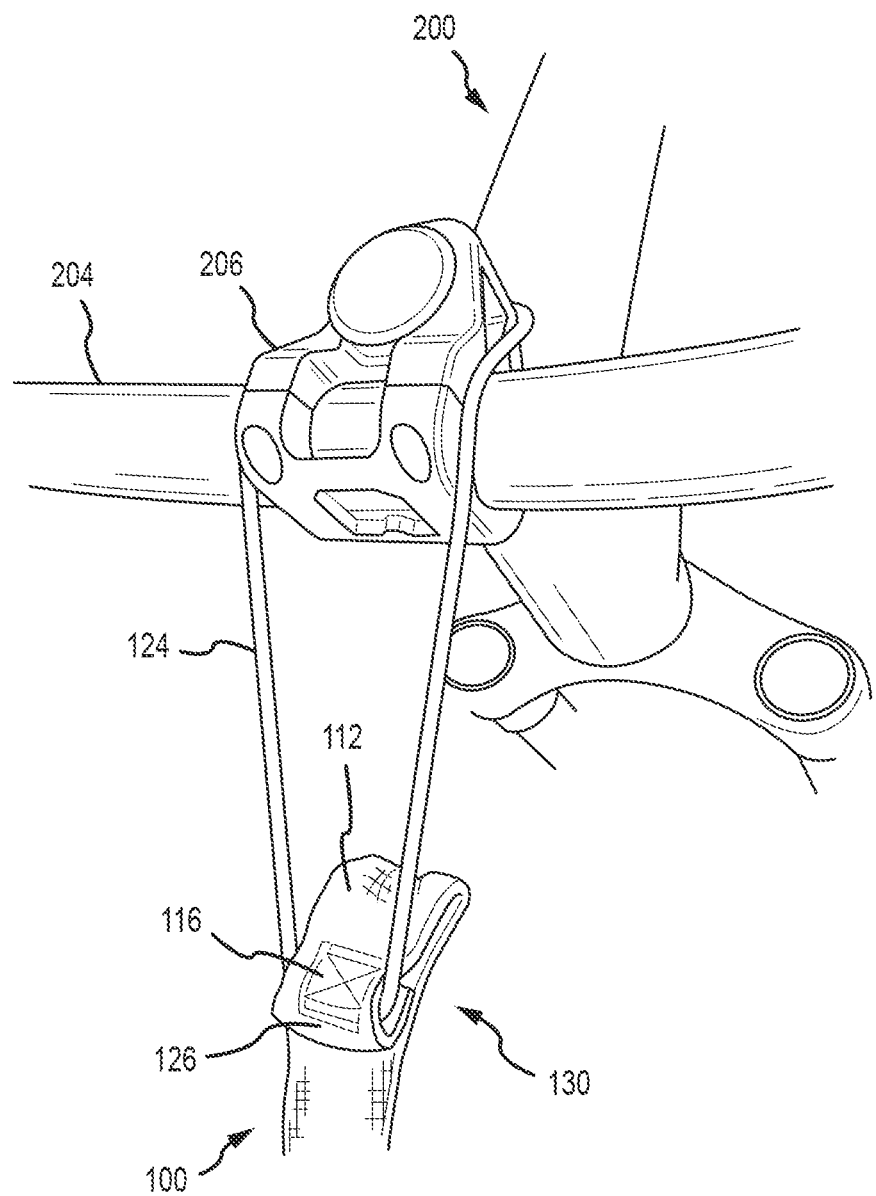
FIG. 8A is a perspective view showing an example of the connecting strap with a first modified end loop attached to a bicycle according to certain embodiments.
Figure 8B:
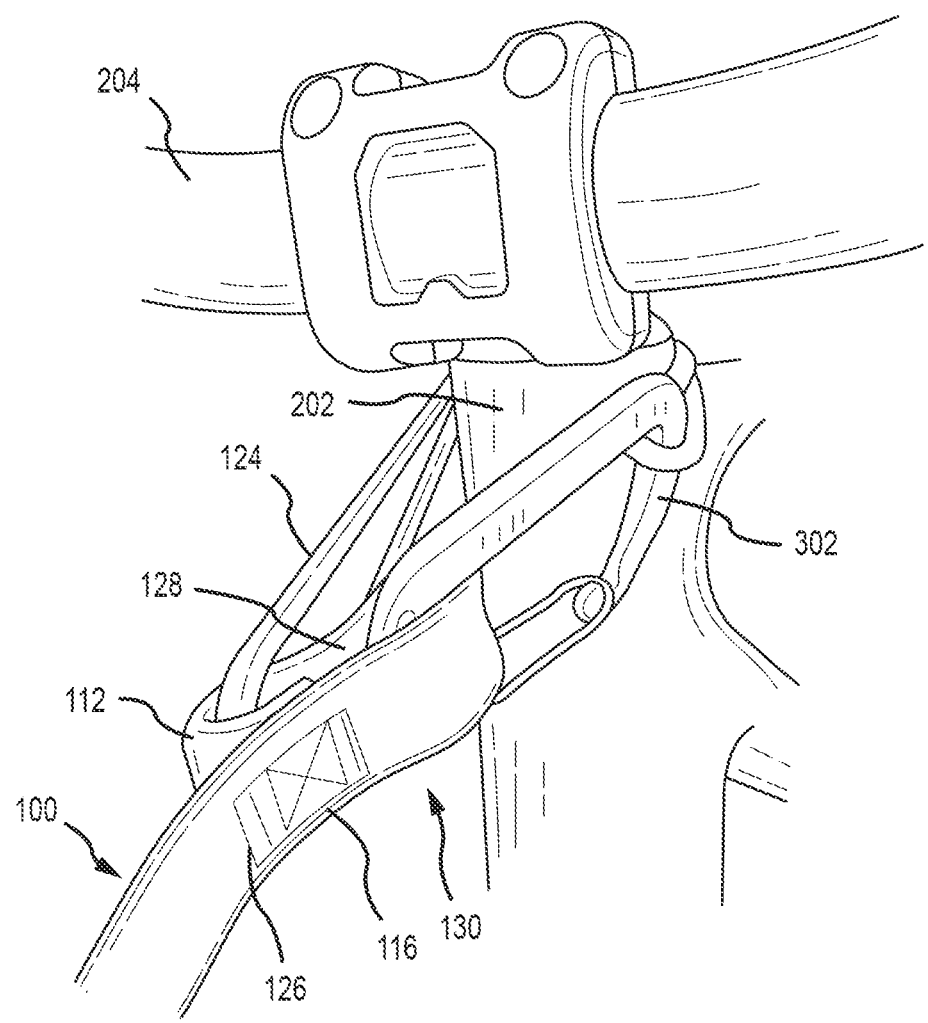
FIG. 8B is a perspective view showing the example of the connecting strap with the first modified end loop clipped around the bicycle using a carabiner, according to certain embodiments.

FIGS. 8A and 8B illustrate an embodiment of the connecting strap 100 in which one of the loops 102, 104 (optionally both) is replaced with a first modified end loop 130 that includes an integrated connecting cord 124 to form a first combination connecting feature. In this embodiment, the first modified end loop 130 is integrally formed with the webbing sleeve 106 by doubling back the free end 112 of the webbing sleeve and securing it to the standing end 114 with the stitching 116, as discussed above with respect to the loops 102, 104. According to one embodiment, the connecting cord 124 is passed through the space (opening) that is formed by tucking the free end 112 under itself against the standing end 124 and securing it with the stitching 116, as discussed above and as shown in FIG. 8B, and secured in place with stitching 126. Thus, the connecting cord 124 is secured in an opening that is separated from the main opening 128 of the modified end loop 130 by the stitching 116.

Figure 7B:
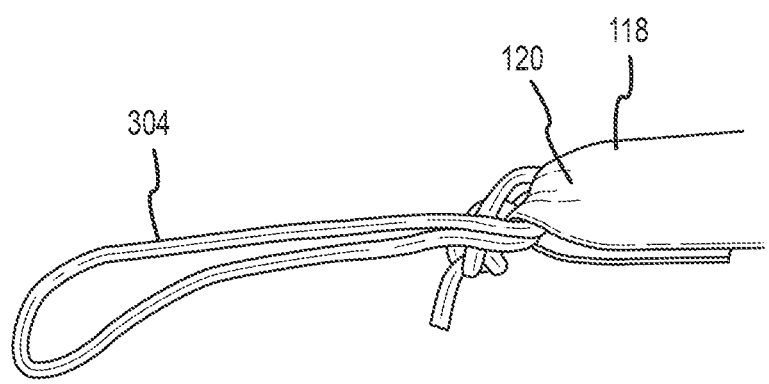
FIG. 7B is a top view of another example of a portion of an end loop of the connecting strap having a connecting cord attached to the pull tab, according to certain embodiments.

According to certain examples, the connecting cord 124 forms a loop without using a knot. Typically, to attach a cord through the loops 102, 104 of the connecting strap 100, the cord must have its ends knotted together such that the cord forms a loop, as shown in FIG. 7B, for example. This is because, conventionally, it is very difficult to sew or stitch cord material, and therefore knots must be used to form the cord into a loop. In contrast, the connecting cord 124 included in embodiments of the connecting strap 100 is formed into a loop without the use of any knot, thereby providing a much neater and more pleasing look. As discussed above, the connecting cord 124 is sewn into the first modified end loop 130 with the stitching 126 and forms a loop without any visible seam. The connecting cord 124 may be formed of a strong, lightweight, flexible cord material. In certain embodiments, the connecting cord 124 is formed of a stiff, wiry cord material, such as polypropylene, for example. The connecting cord 124 may have a diameter in a range of about 2 millimeters (mm) to 6 mm, preferably about 3 mm or 4 mm. A diameter in this range provides a sufficiently strong cord that is lightweight and can be secured to the webbing sleeve 106 with the stitching 126.

As shown in FIG. 8A, in certain applications, the trailing bicycle 200 (or other object) can be attached with the connecting strap 100 by hooking the connecting cord 124 over the handlebars 204 and onto/around the stem bolt 206. This allows for very quick connection and disconnection, while still maintaining a sufficient secure attachment for many applications through the wiry nature or stiffness of the connecting cord 124. In some circumstances, however, such as when the users are riding over very rough terrain, it is possible that the connecting cord 124 may slip off the handlebars 204 before the user wishes to disconnect. Accordingly, a more secure connection may be made by looping the connecting cord 124 around the stem 202 of the bicycle 200 and clipping it with a carabiner 302, as shown in FIG. 8B, for example. The carabiner 302 can be clipped through the main opening 128 of the modified end loop 130, as shown in FIG. 8B, and attached to the connecting cord 124 to form a closed loop, this providing a very secure connection that is very easy and quick to form. Similarly, the connecting strap 100 can be quickly and easily disconnected by unclipping the carabiner 302.

Figure 9A:
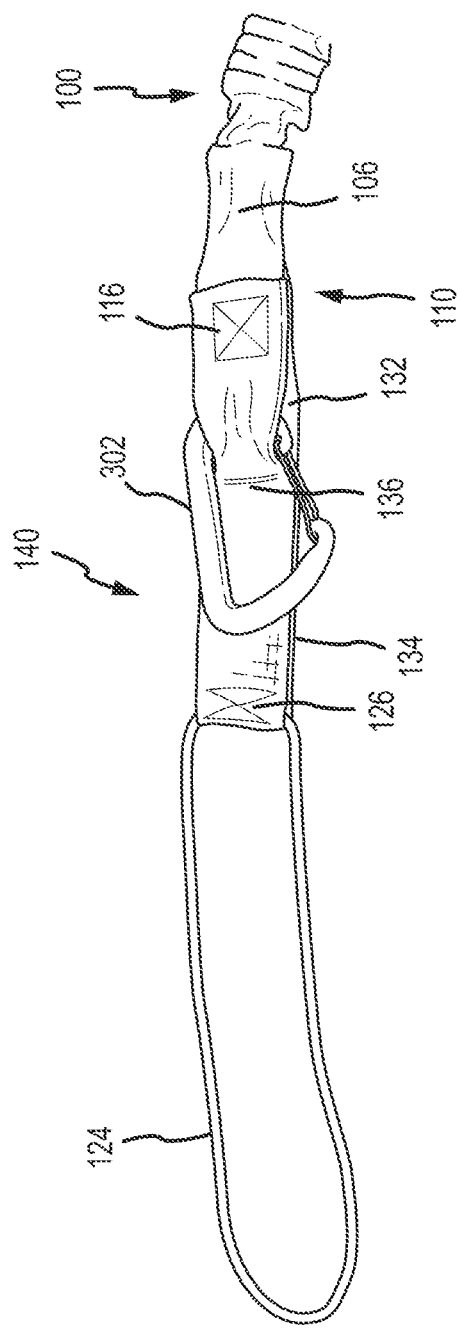
FIG. 9A is a top view of a portion of an example of the connecting strap having a second modified end loop including an integrated connecting cord and carabiner according to certain embodiments.
Figure 9B:
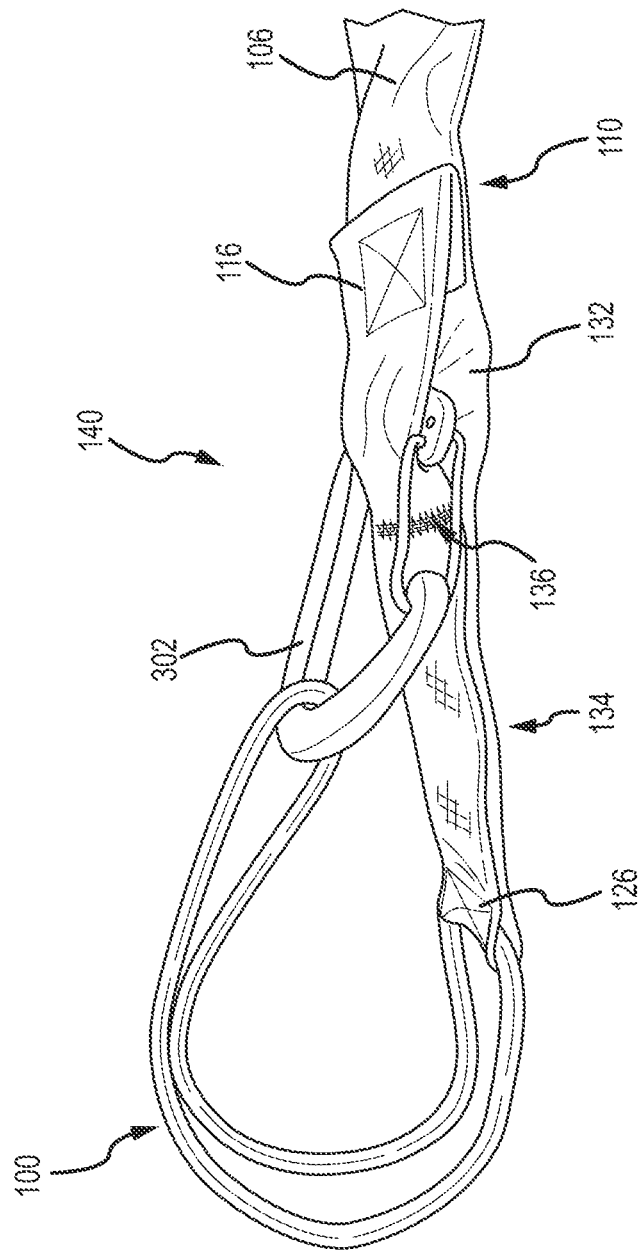
FIG. 9B is a side view showing the second modified end loop of FIG. 9A with the connecting cord looped and connected to the carabiner, according to certain embodiments.

FIGS. 9A and 9B illustrate another embodiment of the connecting strap 100 with a variation of the modified end loop that also includes the integrated connecting cord 124 and an optional carabiner 302. In the example of the first modified end loop 130 shown in FIGS. 8A and 8B, the connecting cord 124 is sewn into the webbing sleeve 106 at the base of the modified end loop 122. In the example shown in FIGS. 9A and 9B, the connecting cord 124 is sewn into the end or tip of the modified end loop 140. As discussed above, the connecting cord 124 is sewn into the webbing sleeve 106 using the stitching 126, such that it forms a loop without a knot and with no visible seam.

In the example of the modified end loop 140 shown in FIGS. 9A and 9B, the end loop is divided into two smaller loops, namely a first subsidiary end loop 132 and a second subsidiary end loop 134 that are separated from one another by stitching 136. The first subsidiary end loop 132 extends from the base 110 of the modified end loop 140 to the stitching 136, and the second subsidiary end loop 132 extends from the stitching 136 to the stitching 126 where the connecting cord 124 is attached. The first and second subsidiary end loops 132, 134 may be the same size or one may be larger than the other. In one example, the first subsidiary end loop 132 is a relatively small loop that allows a clip (such as a D-ring, dog leash clip) or carabiner 302 (as shown in FIGS. 9A and 9B) to be attached to the connecting strap 100, while the second subsidiary end loop 134 is larger. As may be appreciated, a third subsidiary loop that accommodates the integral connecting cord 124 may be formed by stitching 126 at a tip of the modified end loop 140.

Thus, embodiments of the second modified end loop 140 provide the connecting strap 100 with a highly flexible, multi-purpose end loop that can accommodate a variety of connection types useful in many different applications. The integral connecting cord 124 can be looped or hooked over an object, such as the stem bolt 206 of a bicycle 200, as discussed above, or optionally clipped and secured around an object using the carabiner 302, as also discussed above. The second subsidiary end loop 134 may be slipped over or around an object to attach the connecting strap 100 to the object, or may be used in a girth hitch as discussed above. Further, in certain examples, the connecting cord 124 may be attached to an object using a girth hitch or other type of connection.

Figure 10:
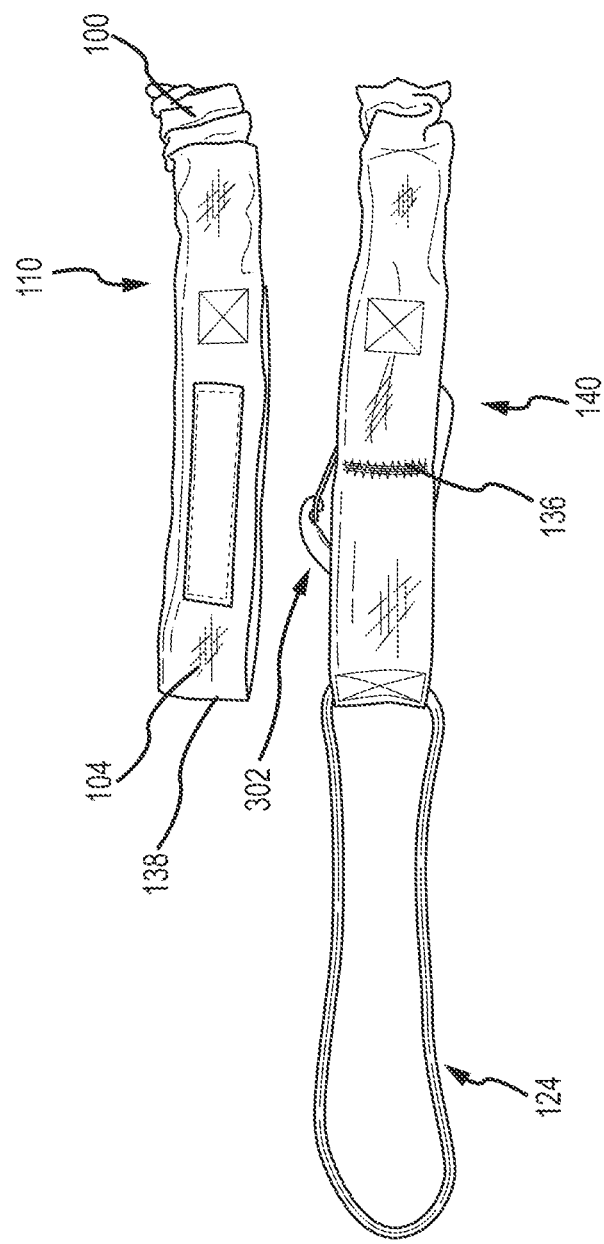
FIG. 10 is a top view showing a portion of an example of the connecting strap with its two ends side-by-side.

According to certain embodiments, the second modified end loop 140 may replace one or both of the end loops 102, 104 of embodiments of the connecting strap 100. Further, the sizes of the end loops 102, 104 and/or the modified end loops 130, 140 may be varied to accommodate different applications or uses. FIG. 10 shows a portion an embodiment of the connecting strap 100 including one end loop 104 and one modified end loop 140. In this example, the end loop 104 has a length, measured from base 110 to tip 138 when flattened against a surface, of about 6 inches, as shown in FIG. 10. Similarly, in this example, the portion of the modified end loop 140 formed of the webbing sleeve 106 also has the same length (measured from base 110 to tip 138 when flattened against a surface, as shown) of about 6 inches. The connecting cord 124 extends an additional length, as shown. The length of the loop formed by the connecting cord 124 may vary, and in some examples, may be in a range of about 4 inches to 10 inches.

Embodiments of the connecting strap 100 can be used in a wide variety of applications, in addition to the bicycling application discussed above. For example, the two users may be on skis, paddleboards, skates, e-bikes, motorbikes, or other types of sports equipment, or the users can be running, hiking or walking. Rather than assisting with uphill or flat travel, the connecting strap 100 can be used to provide braking during downhill travel, in which case the stronger user would be behind the weaker. The connecting strap 100 can also be used as a dog leash, or when skijoring or bike-joring. In addition, the connecting strap 100 can be used to pull an inanimate object when it is desired to not have a jerky connection, for example when skiing with a sled or pulk.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A connecting strap comprising:
    a webbing sleeve having a first end with a first integral end loop and a second end with a second integral end loop, each of the first and second integral end loops being formed by doubling a free end of the webbing sleeve back and securing the free end in place to a standing end of the webbing sleeve with first stitching at a base of the respective integral end loop; and
    a band of elastic material disposed inside the webbing sleeve and attached to the webbing sleeve at the base of each of the first and second integral end loops;
    wherein the first integral end loop includes second stitching that separates the first integral end loop into a first subsidiary loop extending from the base of the first integral end loop to the second stitching and a second subsidiary loop that extends from the second stitching to third stitching at a tip of the first integral end loop, and wherein the tip of the first integral end loop further includes a third subsidiary loop with a connecting cord sewn with the third stitching.

2. The connecting strap of claim 1, wherein the first subsidiary loop accommodates clipping of a carabiner.

3. The connecting strap of claim 1, wherein a length of the third subsidiary loop is smaller than a length of the first subsidiary loop.

4. The connecting strap of claim 1, wherein the first stitching of the first integral end loop is through three layers of the webbing sleeve.

5. The connecting strap of claim 4, wherein the three layers of the webbing sleeve include the standing end of the webbing sleeve and two layers of the free end of the webbing sleeve.

6. The connecting strap of claim 4, wherein the second stitching is through two layers of the webbing sleeve.

7. The connecting strap of claim 6, wherein the third stitching is through three layers of the webbing sleeve.

8. The connecting strap of claim 1, wherein a length of the first subsidiary loop is smaller than a length of the second subsidiary loop.

9. The connecting strap of claim 1, wherein a length of the third subsidiary loop is smaller than lengths of the second subsidiary loop and the first subsidiary loop.

10. The connecting strap of claim 1, wherein the connecting cord does not have a visible seam.

11. A connecting strap comprising:
    a webbing sleeve having a first end with a first integral end loop and a second end with a second integral end loop, each of the first and second integral end loops being formed by doubling a free end of the webbing sleeve back and securing the free end in place to a standing end of the webbing sleeve with first stitching at a base of the respective integral end loop; and
    a band of elastic material disposed inside the webbing sleeve and attached to the webbing sleeve at the base of each of the first and second integral end loops;
    wherein the first integral end loop includes second stitching that separates the first integral end loop into a first subsidiary loop and a second subsidiary loop, wherein a connecting cord is sewn into the second subsidiary loop with the second stitching.

12. The connecting strap of claim 11, wherein a length of the second subsidiary loop is less than a length of the first subsidiary loop.

13. The connecting strap of claim 11, wherein the connecting cord does not have a visible seam.

14. The connecting strap of claim 11, wherein the first subsidiary loop accommodates clipping of a carabiner.

15. The connecting strap of claim 11, wherein the first integral end loop includes third stitching that defines a third subsidiary loop between the first and second subsidiary loops.

16. The connecting strap of claim 15, wherein a length of the third subsidiary loop is greater than or equal to a length of the first subsidiary loop.

17. The connecting strap of claim 15, wherein a length of the second subsidiary loop is less than lengths of the first and third subsidiary loops.

18. A connecting strap comprising:
- a webbing sleeve having a first end with a first integral end loop and a second end with a second integral end loop, each of the first and second integral end loops being formed by doubling a free end of the webbing sleeve back and securing the free end in place to a standing end of the webbing sleeve with first stitching at a base of the respective integral end loop; and
- a band of elastic material disposed inside the webbing sleeve and attached to the webbing sleeve at the base of each of the first and second integral end loops;
- wherein at least one of the first and second integral end loops includes a pull tab formed at an end of the respective integral end loop by tab stitching that extends through both the free and the standing end of the webbing sleeve to define and separate the pull tab from a main opening of the integral end loop.

19. The connecting strap of claim 18, wherein an opening defined by the pull tab is smaller than the main opening.

20. The connecting strap of claim 18, wherein the pull tab accommodates clipping of a carabiner.

\* \* \* \* \*